Aug. 1, 1933.    A. C. FULTON    1,920,372
PAPIER-MACHÉ ARTICLE
Filed Jan. 21, 1932
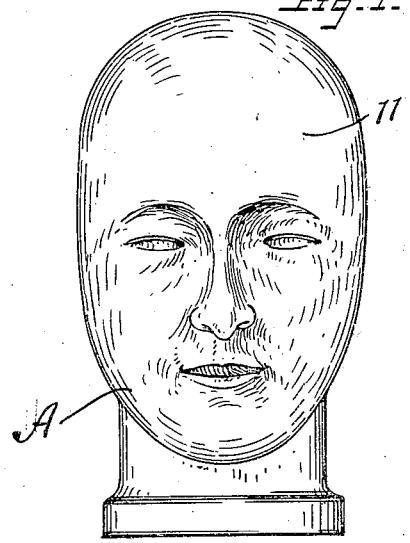
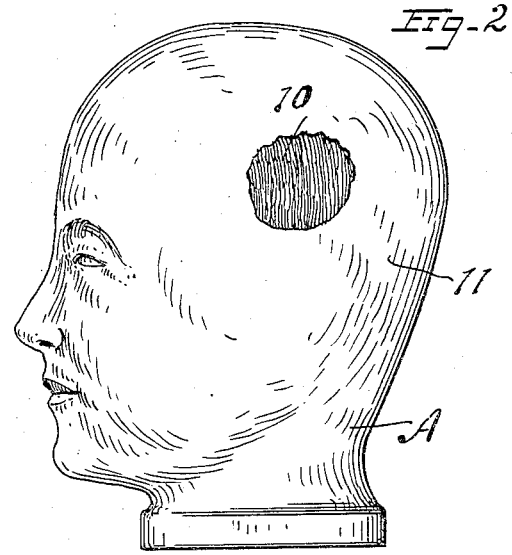
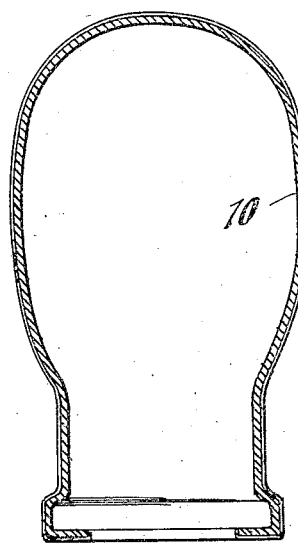
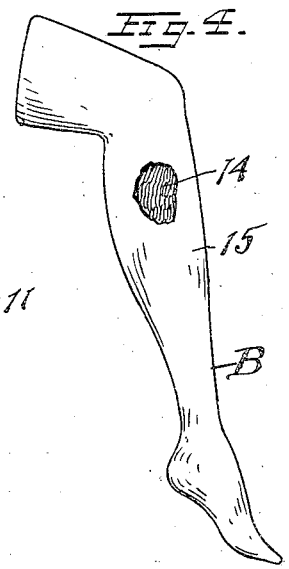
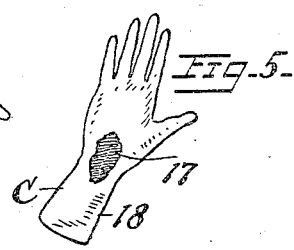
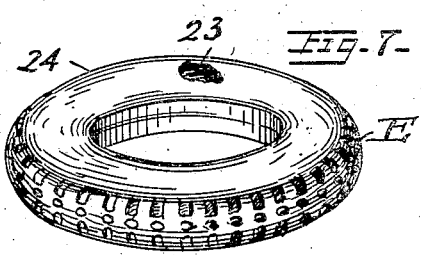
Inventor.
ALFRED C. FULTON.
Kwis Hudson & Kent
attys.

Patented Aug. 1, 1933

1,920,372

UNITED STATES PATENT OFFICE 1,920,372

PAPIER-MÂCHÉ ARTICLE

Alfred C. Fulton, Ashtabula, Ohio, assignor to the Aetna Rubber Company, Ashtabula, Ohio, a Corporation of Ohio Application January 21, 1932. Serial No. 587,932

4 Claims. (Cl. 40—126.)

The present invention relates to papier-mâché articles and more particularly to three dimension display and advertising devices made of papier-mâché coated with rubber.

An object of the present invention is the provision of a rubber covered papier-mâché article.

Another object of the invention is the provision of an article which may be used for inside or outdoor display and/or advertising purpose which will be light in weight, inexpensive to manufacture, easily formed or made in different shapes etc., and which will withstand adverse weather conditions without deterioration etc.

Another object of the invention is the provision of a display device which may be used for displaying articles, especially wearing apparel such as women's hats, hose, gloves, etc., which will be light in weight, easily cleaned, can be made in a plurality or shapes and/or colors, and which will have a soft, resilient, and smooth outside surface.

Further objects of the invention will be apparent to those skilled in the art from the following description of the preferred embodiment of the invention described with reference to the accompanying drawing, in which Fig. 1 is a front elevational view of a representation of a human head;

Fig. 2 is a side elevational view of the representation shown in Fig. 1;

Fig. 3 is a sectional view of the representation shown in Figs. 1 and 2;

Fig. 4 is a perspective view of a representation of a human leg;

Fig. 5 is a perspective view of a representation of a human hand;

Fig. 6 is a perspective view of a representation of a human figure designed for use as an outdoor advertising device; and Fig. 7 is a perspective view of an automobile tire.

Referring to the drawing, Figs. 1, 2 and 3 show a representation of a human head suitable for advertising purposes and/or for displaying hats, bathing caps, etc., and indicated in general by the reference character A. The head A may be of any desired shape and consists of a body portion 10 made of suitable material, such as papier-mâché coated or covered with a layer of rubber 11, the thickness of which may be varied to suit the particular purpose.

The rubber coating may be applied by dipping or any other usual manner, such as spraying as a latex or otherwise. Due to the porous construction of the papier-mâché, the rubber penetrates into the same a considerable extent and tightly adheres thereto. The coating may be made of any thickness desired, depending upon the requirements of the particular construction, by dipping the article a plurality of times, etc. The rubber is preferably vulcanized and may be what is called "self curing."

The rubber presents a soft, resilient, smooth surface and may be made in a variety of colors or combinations thereof. In the case of representations of human bodies, etc., the rubber may be given a natural color and will be free from gloss or shine, one of the disadvantages of representations made of china, etc. Because of the penetration of the rubber 11 into the porous papier-mâché 10 the bond between the coating and the body will be such that separation of the two is practically impossible, which feature, together with the fact that the rubber coating 11 will stretch with contraction and expansion of the body part 10 and not crack as will paint, etc., produces an article which will withstand extreme adverse weather conditions without injury.

Fig. 4 shows a representation of a human leg B, designed and adapted to be used in displaying hosiery, etc., comprising a papier-mâché body portion indicated by the reference character 14 and a rubber coating or covering indicated by the reference character 15.

Fig. 5 shows a representation of a human hand C, used for displaying gloves, etc. The hand C is made of a papier-mâché body portion 17, and a rubber coating or covering 18. The soft, resilient surface of the rubber coating permits the positioning and removal of the merchandise, hosiery, gloves, etc., from representation similar to those shown in Figs. 4 and 5, without injury thereto.

The device illustrated in Fig. 6, and indicated in general by the reference character D, is designed preferably for outdoor advertising purposes, and is made of a papier-mâché body portion 20 and a rubber coating or covering 21. The features of the invention referred to above make these articles very desirable for outdoor advertising purposes, particularly of the type referred to as "three dimension advertising". Papier-mâché articles of this nature, while relatively inexpensive to manufacture are very fragile and quickly deteriorate when exposed to moisture, etc., and when used for outdoor advertising purposes cannot be adequately protected by conventional methods, because of the expansion and contraction of the body portion, etc., and the subsequent cracking of paint, etc., used to resist the elements of the weather.

Fig. 7 shows a rubber tire E made of a papier-mâché body portion 23 provided with a rubber coating or covering 24. Articles of this nature are designed for advertising purposes and enable a dealer to carry what appears to be a large stock of tires without a large investment, especially in tires for which there is little market because of their large size etc. The tire illustrated to all appearances represents a tire suitable for use on automobiles, etc.

As used throughout the specification and claims, the phrase "display device" includes advertising devices as well, and the word "rubber" includes rubber substitutes which have most of or all the properties and/or features of rubber.

From the above detailed disclosure of the invention, it will be evident that I have produced a cheap, durable article, which has particular advantages and features for advertising and display purposes not known to the prior art. Numerous modifications will suggest themselves to those skilled in the art, and I do not wish to be limited to the particular construction shown, which may be modified within the scope of the invention and particularly point out and claim as my invention the following:

I claim:

1. A display device comprising a papier-mâché body portion, and a coating of rubber, said rubber coating impregnating the adjacent surface of said papier-mâché.

2. In a display device, a representation of a portion of a human figure made of papier-mâché, and a coating of rubber, on said papier-mâché, said rubber coating impregnating the adjacent surface of said papier-mâché.

3. A three dimension advertising device comprising a three dimension papier-mâché body portion, and a coating of rubber, on said body portion, said rubber coating impregnating the adjacent surface of the papier-mâché.

4. In a display device a papier-mâché body portion, a rubber coating on said body portion, said rubber coating impregnating the adjacent surface of said papier-mâché and being vulcanized in position.

ALFRED C. FULTON.